United States Patent [19]

Lodi et al.

[11] Patent Number: 4,530,633
[45] Date of Patent: Jul. 23, 1985

[54] METHOD AND DEVICE FOR THE FEEDING OF ROD-LIKE ARTICLES TO THE HOPPER OF A HANDLING MACHINE

[75] Inventors: Oliviero Lodi, Pontecchio di Sasso Marconi; Gianni Armaroli, Bologna, both of Italy

[73] Assignee: SASIB S.p.A., Bologna, Italy

[21] Appl. No.: 382,806

[22] Filed: May 27, 1982

[30] Foreign Application Priority Data

Jun. 2, 1981 [IT] Italy ............... 12538 A/81

[51] Int. Cl.³ ............................................. B65B 19/04
[52] U.S. Cl. ..................... 414/414; 131/283; 221/11; 53/148; 414/421; 414/786
[58] Field of Search ............... 414/294, 403, 414, 421, 414/786; 131/282, 283; 53/148, 236; 221/10, 11, 14, 216

[56] References Cited

U.S. PATENT DOCUMENTS

| | | | |
|---|---|---|---|
| 1,666,986 | 4/1928 | Bauml | 53/154 |
| 3,324,622 | 6/1967 | Schmermund | 53/148 X |
| 3,534,522 | 10/1970 | Liedtke | 53/236 X |
| 3,655,080 | 4/1972 | Gianese | 414/403 X |
| 3,883,017 | 5/1975 | Shirai et al. | 414/403 X |
| 4,403,908 | 9/1983 | Cartoceti | 414/414 X |

FOREIGN PATENT DOCUMENTS 837911 6/1960 United Kingdom ............... 221/11

Primary Examiner—Joseph E. Valenza
Assistant Examiner—Ken Muncy
Attorney, Agent, or Firm—Spencer & Frank

[57] ABSTRACT

A method and a device for feeding rod-like articles, particularly cigarettes, carried by trays, to the feed hopper of handling machines, particularly cigarette-packing machines. In order to assure a broad time period to replace an emptied tray and to practically avoid the sudden drop of the cigarettes from the tray into the hopper, two trays in discharge position and aligned to each other in the direction of the hopper length, are arranged over the inlet opening of the hopper. The descent of the cigarettes into the hopper is permitted alternately only from one of the trays until it is emptied, while the other previously emptied tray is replaced with a stand-by full tray. The descent of the cigarettes into the portion of the hopper in register with the tray being emptied, is discontinued and prevented as soon as the tray has been emptied, so that the level of the cigarettes in the corresponding underlying portion of the hopper is maintained just below the lowest layer of cigarettes in the new full tray which is arranged in discharge position as a substitute for the emptied tray.

10 Claims, 10 Drawing Figures

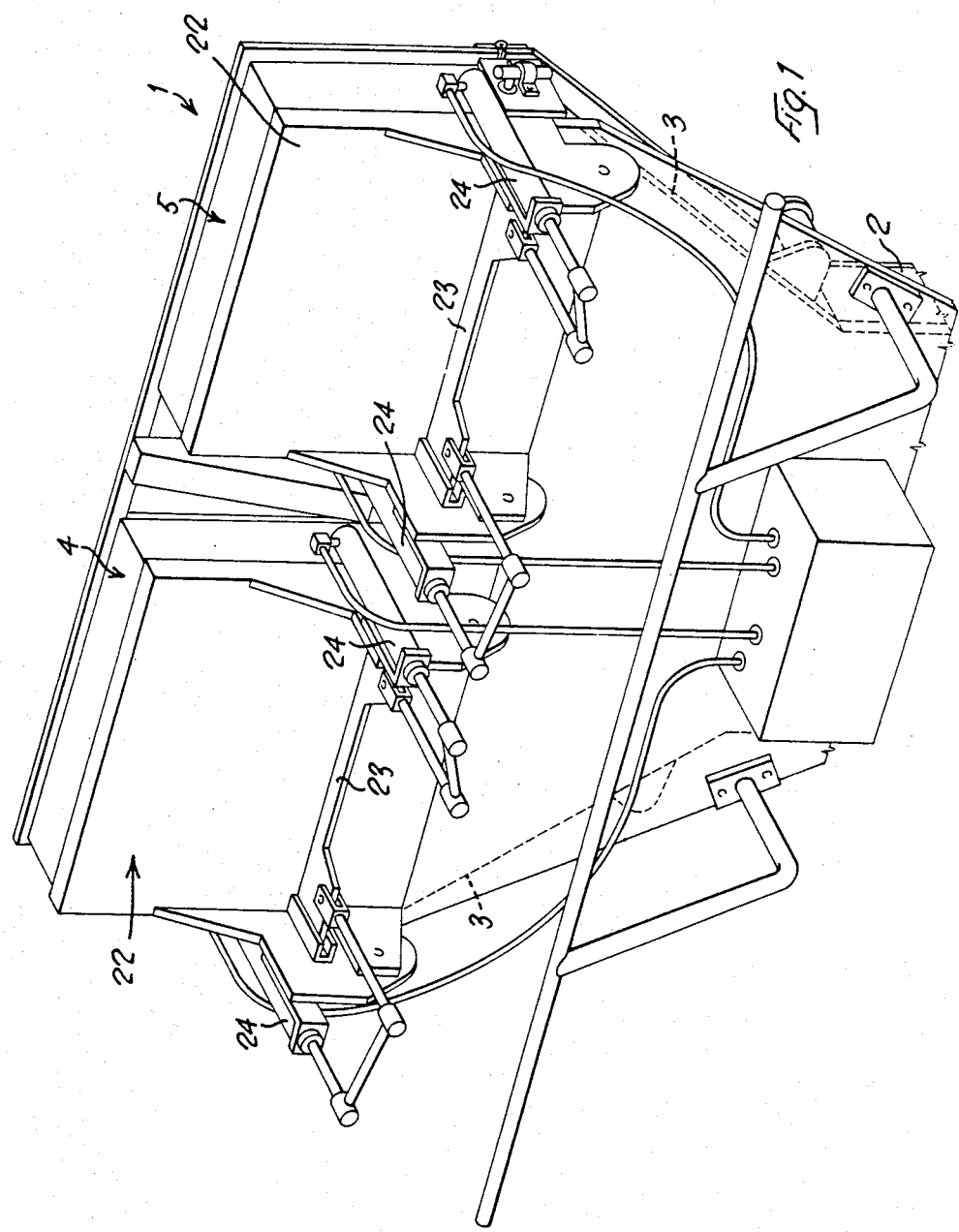

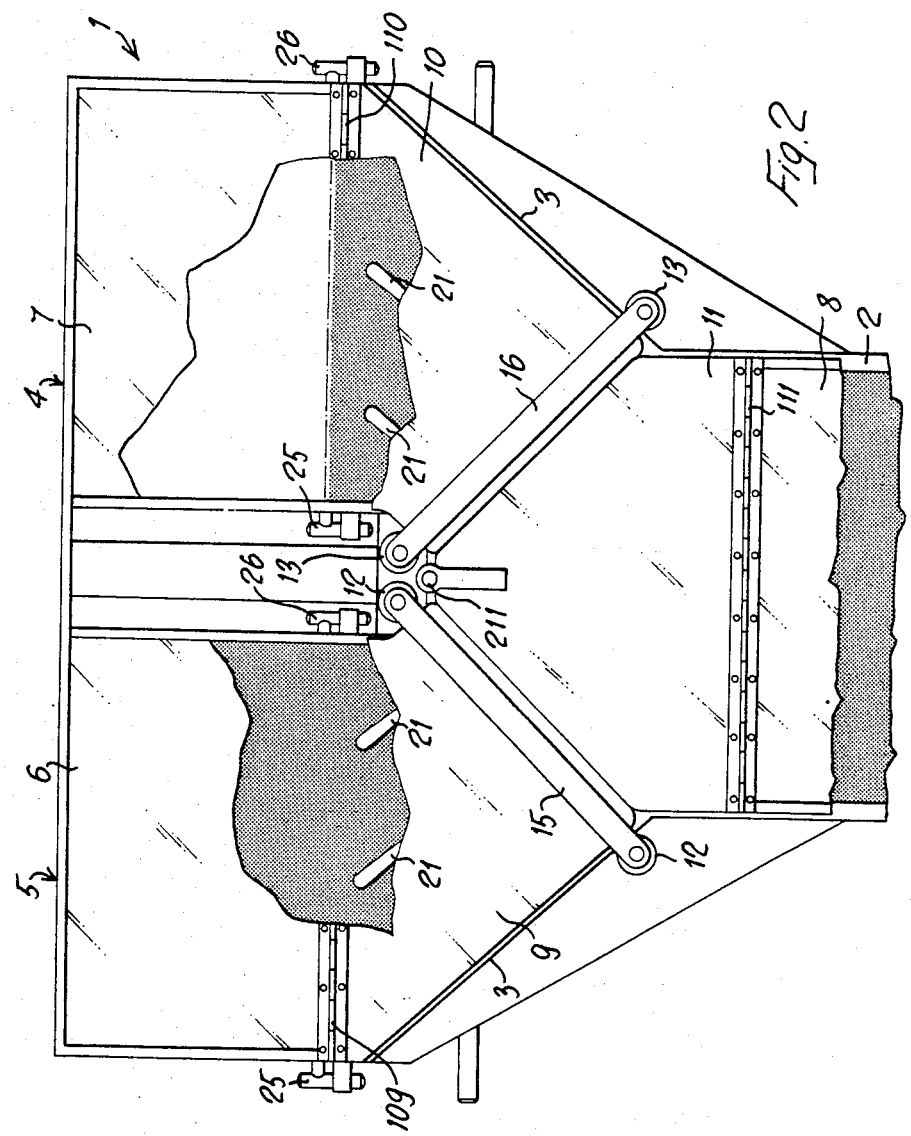

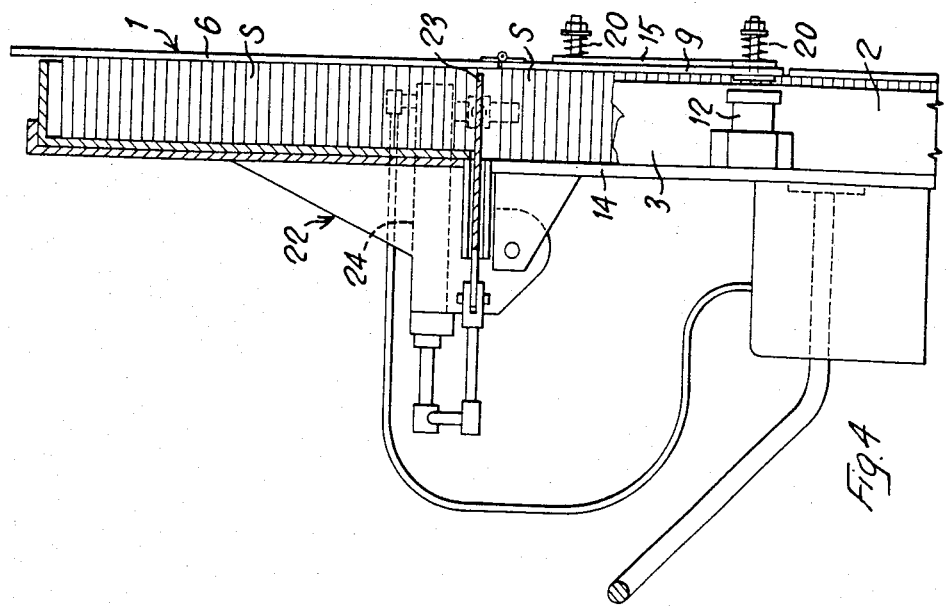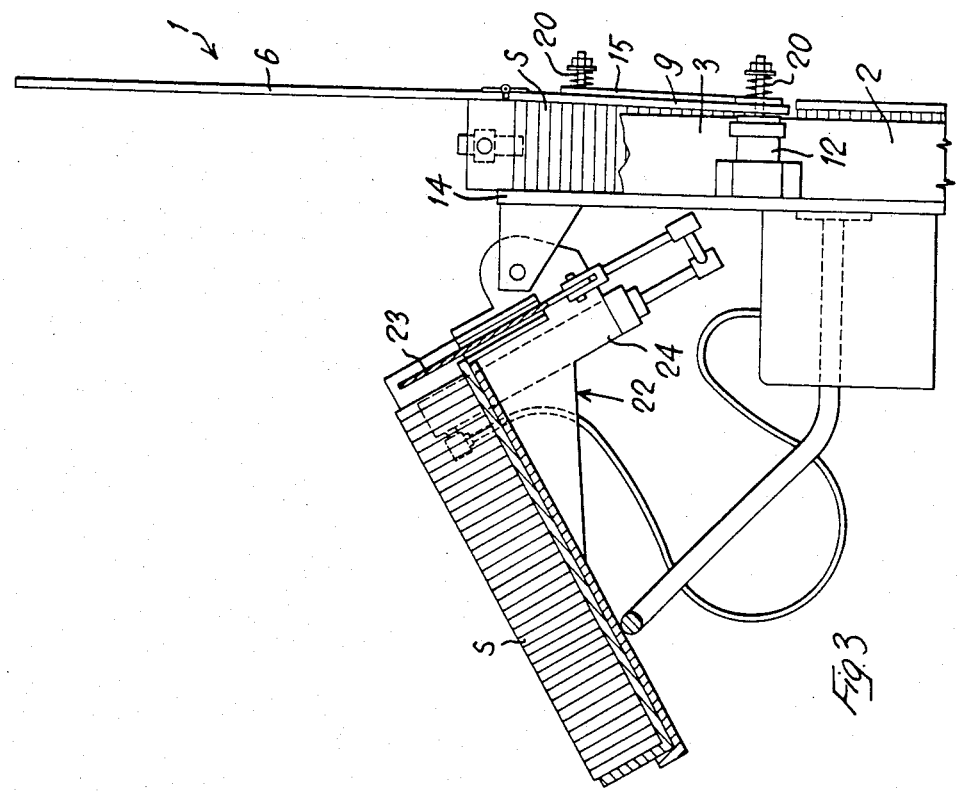

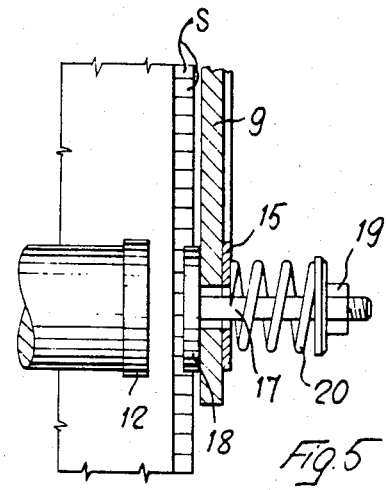
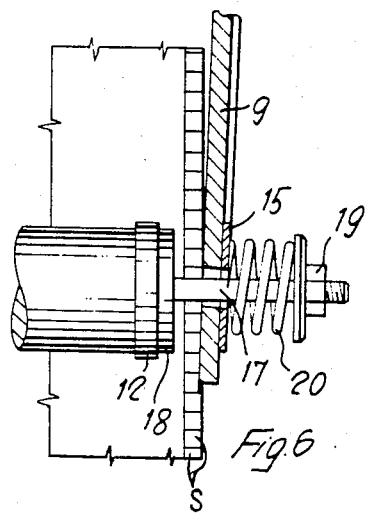
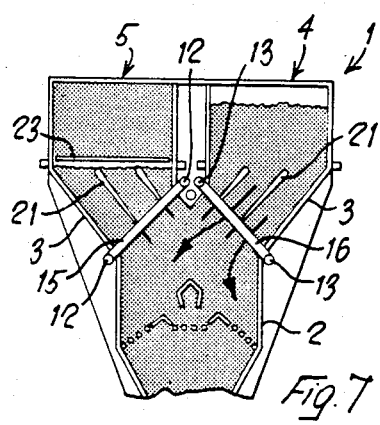
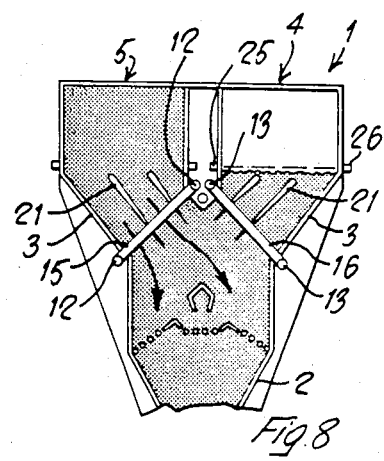
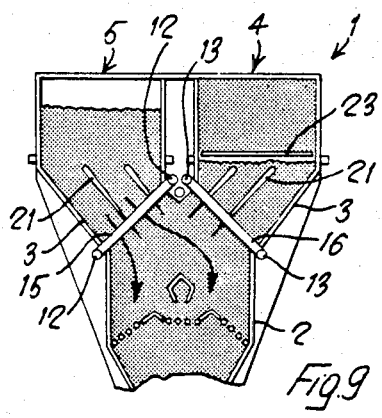
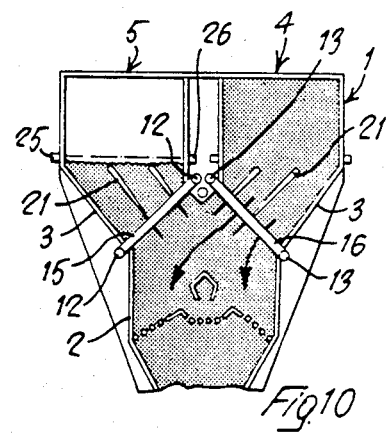

METHOD AND DEVICE FOR THE FEEDING OF ROD-LIKE ARTICLES TO THE HOPPER OF A HANDLING MACHINE

BACKGROUND AND SUMMARY OF THE INVENTION

This invention relates to a method and a device for feeding rod-like articles, particularly cigarettes, by means of trays, into the feed hopper of handling machines, particularly cigarette-packing machines.

By the term "trays" are meant herein parallelopiped containers, open at the top and at one side face, in which said rod-like articles or cigarettes are orderly arranged in superposed layers.

Feeding devices of the specified type are known in which the full tray, after the automatic introduction thereof in a casing or frame, which closes the open sides thereof, is overturned on the hopper which gradually receives the contents thereof by opening a suitable bottom wall of the casing.

The command to replace an emptied tray with a full one is issued, usually, by a photocell-sight device detecting the level of the articles in the hopper.

Between the moment at which the replacement command is issued and the moment at which the bottom wall of said casing is opened, a period of time elapses during which the level of the articles in the hopper falls down.

As a consequence, upon the opening of the bottom wall of the casing, the articles issuing from the tray will experience a sudden drop the extent of which increases with the speed of the packing machine, by maintaining the same period of time to replace the tray.

Such a drop, obviously, creates operational disturbances, and in order to avoid or minimize them within satisfactory limits, devices have been proposed to feed rod-like articles in trays to a hopper in which a rotary turnover device comprises a pair of frames or casings each of which can receive a full tray, whereby while the tray of one casing is discharging its batch of articles into the hopper, suitable substitution means remove an emptied tray from the other casing and arrange a full tray therein, so that as soon as the tray on the hopper has been emptied, said turnover device will rotate so as to turn a full tray over said hopper.

Still for the purpose of minimizing the time for said substitution, tray-supplying devices have been devised wherein a full tray is previously brought into a stand-by position in proximity of the hopper.

Other tray-supplying devices have been proposed wherein, by means of retractable walls, for example of winding or telescoping type, supplemental storing volumes are generated at a due time, momentarily extending the side walls of the tray, whereby an emptied tray can be moved away beforehand and a new full tray can be brought into the discharge position.

The main object of this invention is to provide a method for feeding cigarettes or other rod-like articles by means of trays to the feed hopper of a handling machine, and particularly a packing machine, so as to avoid practically any drop of the cigarettes from the tray to the hopper and the resulting consequences, yet affording a sufficient period of time to replace an emptied tray.

The method according to the invention is substantially characterized by the fact that two trays in discharge position are placed over the inlet opening, and are aligned to each other in the direction of the larger dimension of the hopper inlet opening and the descent of the cigarettes is permitted alternately only from one of said trays until it is emptied, while the other emptied tray is replaced with a stand-by full tray.

Substantially, according to the method of the invention, a hopper whose inlet opening has a major dimension which is twice that of one tray is fed by a pair of trays which are aligned in the direction of their length and are both in the discharge position, while the discharge of cigarettes into the hopper below one of the trays is prevented, and the means preventing the discharge are switched over to the other tray whenever the functions of the trays are to be switched over, i.e. upon each changeover from the stand-by step to the discharge step, and vice versa.

More particularly, the discharge of cigarettes into the hopper portion being fed in discontinued as soon as the tray which is discharged has been emptied, whereby the level of the cigarettes in this hopper portion is kept unchanged. This level, upon the replacement of an emptied tray with a full one, will be just below the cigarettes resting on the bottom of the casing that houses said new tray. When a tray in the discharge step is being emptied, the descent of the cigarettes into the hopper portion below the stand-by tray is prevented, so that the pre-established level of cigarettes in this hopper portion will not change. The descent of the cigarettes into the hopper portion below the stand-by tray will be permitted immediately after the depletion of the tray being discharged into the other hopper portion.

BRIEF DESCRIPTION OF THE DRAWINGS

The characteristic features of the invention and the advantages resulting therefrom will be apparent from the following detailed description of a preferred embodiment thereof, shown in the accompanying drawings, in which:

FIG. 1 is a perspective view of a feed device according to the invention;

FIG. 2 is a front view of the feed device of FIG. 1;

FIG. 3 is a side elevational view of the device of FIGS. 1 and 2, in the step of reception of a full tray;

FIG. 4 is a view similar to FIG. 3, in the step of positioning of the just-received tray;

FIG. 5 shows a detail of FIG. 4, concerning the stop means to prevent the descent of cigarettes into the hopper, said means being deactivated;

FIG. 6 shows the same detail of FIG. 5, but with the stop means in the activated condition;

FIGS. 7, 8, 9 and 10 are diagrammatic vertical sectional views of the device according to the invention in successive basic steps of its operative cycle.

With reference to the Figures, the feed device 1 according to the invention comprises a hopper 2 differing from conventional hoppers in that it includes an additional flaring portion 3 so as to substantially double the larger dimension, or length, of its inlet opening to permit the hopper to be fed by two end-to-end trays 4, 5.

On the front side, the hopper 2, 3 is defined by transparent walls 6, 7, 8 including doors 9, 10, 11 hinged about axes parallel to the inlet opening on hinges 109, 110, 111, respectively.

In the closed condition, assured, for example, by a permanent magnet, the rabbet edges of the door 11 overlap the edges of the doors 9 and 10 and keep them parallel with the back wall 14 of the hopper 1.

The permanent magnet keeping the door 11 in the closed position is indicated by the numeral 211.

The doors 9 and 10, at the edges overlapped by the edges of the door 11, are stiffened by transverse bars 15, 16, respectively, provided with through holes at each end thereof. Slidably mounted in each hole there is a cylindrical stem 17 (FIG. 5) having a disc or keeper 18 fixed at one end thereof and a nut 19 threadedly engaged on the other end thereof. A spring 20, interposed between the transverse bar 15, respectively 16, and the nut 19, keeps the corresponding disc 18 contacting with the associated door 9, respectively 10.

The discs 18 at the ends of the transverse bar 15, respectively 16, cooperate with the respective pairs of electromagnets 12, 13.

When one of said pairs of electromagnets, for example the pair 12, is de-energized, the respective door 9, respectively 10, is parallel to the back wall 14 of the hopper 1, with a spacing just larger than the length of the cigarettes.

In the energized condition, the electromagnets of the pair 12 attract the respective discs 18 and cause an inward pivotal movement of the door 9 which, therefore, will exert, by its facing edge, a slight pressure on the cigarettes S in the corresponding half of hopper portion 3. This pressure causes the cigarettes to act as a supporting bridge or barrier that restrains the cigarettes lying above, so as to prevent them from flowing down into the body 2 of the hopper.

In order to avoid any perceivable damage to the pressure-engaged cigarettes as from the preceding paragraph, a lining of resilient material (not shown) is applied on said contacting edge of each upper door 9, 10. Obviously, the active surface of this lining will be flush with the inner surface of the door lined thereby.

During the emptying step of the active tray, in order to maintain the free surface of the batch of cigarettes in a substantially horizontal condition, some inclined partitions 21, which may be of conventional type, are secured at the inlet opening of the hopper.

These partitions are intended to divide the descending batch of cigarettes into a plurality of streams having different characteristics of resistance to the descent.

To overturn the trays 4, 5 on the inlet of the upper portion 3 of the hopper, swinging supports or frames 22 are provided, each comprising a retractable transom blade 23, the opening and closing of which is controlled by a pair of pneumatic cylinders 24.

In order to check the level of the cigarettes in the two hopper portions 3, two respective sight devices of conventional type are used, comprising, for example, a light source 25 and a photocell 26.

The feeding movement of the full trays and the removing movement of the depleted trays are effected by conveying means which are not illustrated here because they are not within the scope of this invention.

The operation of the device illustrated above is as described hereinafter and as shown in FIGS. 7 to 10 of the accompanying drawings, assuming that, initially, the stand-by tray is the one (5) standing on the left portion of the inlet (3, 3) of the feeding hopper. In this instance, the respective transom 23 is closed, thus preventing said tray 5 from being discharged.

The electromagnets 12 are energized whereby said door 9, urged to swing inwards of the pre-hopper 3, exerts a slight pressure against the cigarettes S along a marginal portion thereof corresponding to the area of the door that is directly affected by said electromagnets, thus forming with said cigarettes something like a barrier supporting the cigarettes thereabove, so as to maintain the existing level of the cigarettes below the transom 23.

In these conditions, the tray 4 on the right-hand portion of the hopper inlet 3 is now being emptied. Obviously, the electromagnets 13 are de-energized and the door 10 is parallel to the back wall 14 of the hopper, thus permitting an unobstructed descent of the cigarettes S into the body of the hopper 2 from the right-hand portion of the hopper inlet 3 (FIG. 7).

When the tray 4 has been emptied completely (FIG. 8), the light beam from the source 25 will impinge against the corresponding photocell 26, thus generating a control signal initiating the following series of operations: (1) the electromagnets 13 are energized to swing the door 10 inwards, thus preventing the descent of the cigarettes at the interior of said right-hand portion of the hopper, whereby the level of the cigarettes is maintained unchanged; (2) the transom 23 keeping the cigarettes in the tray 5 (now on stand-by) is opened; (3) the electromagnets 12 are de-energized to permit the free descent of the cigarettes from the tray 5 at the left portion of the hopper inlet 3; (4) the transom 23 on the right-hand portion of the hopper (emptied tray 4) is closed, so as to support this tray during the turnover of the respective support or frame 22.

While the tray 5 on the left side of the hopper (FIG. 9) is being emptied, a new stand-by tray for the successive loading cycle can be arranged in the casing 4 on the right-hand side of the hopper.

FIG. 10 shows the initial condition of FIG. 7, but while awaiting for a full stand-by tray in the left-hand casing 5.

It is apparent from the above that the drop of cigarettes from each tray 4, 5, into the hopper 3, 2 is of negligible extent, and that this result is obtained without complicating mechanically the structure of the conventional devices.

Of course, the invention is not limited to the embodiment here shown and described by way of example, but changes and modifications can be made thereto, without departing from the broad scope of the inventive principle, as set forth above and as claimed hereinafter.

We claim:

1. A device for feeding cigarettes to a cigarete handling machine from a plurality of trays, each tray containing a plurality of the rod-like articles with the axes of the articles extending parallel to a first dimension of the tray and each tray having a second dimension transverse to its first dimension, said device comprising: a hopper disposed for receiving articles from the trays and for supplying the articles to the machine, said hopper having a flared inlet having two inlet portions; means for supporting two of the trays in line with each other in the direction of the second dimension of the trays above said flared inlet, with said inlet portions defining respective inlet openings which are dimensioned, in the direction of the second dimension of the trays, to receive the two trays when the two trays are supported above said inlet, said inlet opening thus having a separate inlet portion below each tray, and control means for permitting the descent of articles alternately from only one of the two trays until that tray is emptied while permitting a previously emptied tray to be replaced with a full tray, said control means including means operatively associated with each said inlet portion for preventing descent of cigarettes through the inlet portion in register with a tray being emptied as soon as that tray has been emptied, so that the level of cigarettes in the corresponding inlet portion is maintained just below the lowest layer of cigarettes in the stand-by full tray which replaces the previously emptied tray.

2. A device according to claim 1 wherein: said means for supporting comprise a pair of turnover swinging supports arranged side-by-side over said flared inlet for supporting two such trays over said flared inlet; said hopper comprises front door-like portions pivotable for controlling the descent of articles through each said inlet portion; and said control means comprise means defining light barriers for sensing the emptying of each tray, blade transoms disposed for selectively closing the bottom of each tray, and electromagnet means associated with each said door-like portion for selectively pivoting each said door-like portion into a position to block descent of articles through the associated inlet portion, said transoms and said electromagnet means being actuatable under control of said light barriers for blocking descent of articles through one inlet portion in response to emptying of the tray associated with that inlet portion in order to permit replacement of the emptied tray.

3. A device according to claim 2, characterized by the fact that suitably-shaped inclined and spaced partitions are arranged in each hopper inlet portion to divide into a plurality of streams the descending batch of articles.

4. A device according to claim 2, characterized by the fact that said electromagnet means comprises electromagnets each cooperating with a respective spring-urged disc or keeper to press each of said door-like portions inwardly by a limited amount, so as to delicately brake the descending flow of articles from the tray thereabove into said hopper.

5. A device as defined in claim 1 wherein the cigarette handling machine is a cigarette packaging machine.

6. A method for feeding cigarettes from trays to the feed hopper of a cigarette handling machine, the hopper having two inlet portions each presenting an inlet opening having a first dimension of the order of magnitude of the axial dimension of the cigarettes and a second dimension which is transverse to, and greater than, the first dimension, said method comprising arranging two trays in discharge position and in line with each other in the direction of the second dimension of the hopper inlet portions, with each tray being over the inlet opening of a respective inlet portion; causing cigarettes to descend alternately only from one of the two trays at a time until the one tray has been emptied; replacing each tray, after it has been emptied, with a stand-by full tray, while cigarettes continue to descend into the hopper from the other tray; and preventing descent of cigarettes through the inlet portion of the hopper in register with a tray being emptied as soon as that tray has been emptied, so that the level of cigarettes in the corresponding inlet portion of the hopper is maintained just below the lowest layer of cigarettes in the stand-by full tray which replaces the previously emptied tray.

7. A method as defined in claim 6 wherein the cigarette handling machine is a cigarette packaging machine.

8. A method for feeding cigarettes from trays to the feed hopper of a cigarette handling machine, the hopper having two inlet portions each presenting an inlet opening having a first dimension of the order of magnitude of the axial dimension of the cigarettes and a second dimension which is transverse to, and greater than, the first dimension, said method comprising arranging two trays in discharge position and in line with each other in the direction of the second dimension of the hopper inlet portions, with each tray being over the inlet opening of a respective inlet portion; causing cigarettes to descend alternately from one of the two trays at a time until the one tray has been emptied; replacing each tray, after it has been emptied, with a stand-by full tray, while cigarettes continue to descend into the hopper from the other tray; and, while one of the trays is being emptied, preventing the descent of cigarettes at the interior of the inlet portion below the other tray.

9. A method according to claim 8 further comprising, immediately after emptying of the one tray from which cigarettes are being caused to descend, permitting descent of the cigarettes inside the inlet portion of the hopper underlying the other tray.

10. A method as defined in claim 8 wherein the cigarette handling machine is a cigarette packaging machine.

* * * * *